United States Patent [19]

Rawlings et al.

[11] 4,420,584

[45] Dec. 13, 1983

[54] GLASS-FILLED POLYCARBONATE OF IMPROVED IMPACT STRENGTH

[75] Inventors: Herbert L. Rawlings, New Martinsville, W. Va.; Gerard E. Reinert, McMurray, Pa.

[73] Assignee: Mobay Chemical Corporation, Pittsburgh, Pa.

[21] Appl. No.: 258,817

[22] Filed: Apr. 29, 1981

[51] Int. Cl.³ .............................................. C08L 69/00
[52] U.S. Cl. .................................... 524/502; 524/611
[58] Field of Search ............ 260/37 PC, 42.18, 42.14; 525/146, 176, 148; 524/611, 502

[56] References Cited

U.S. PATENT DOCUMENTS

| | | | |
|---|---|---|---|
| 3,586,659 | 6/1971 | Hay et al. | 260/78.5 T |
| 3,678,079 | 7/1972 | Carty et al. | 525/148 |
| 3,732,337 | 5/1973 | Heilman | 260/897 B |
| 3,862,998 | 1/1975 | Koehler et al. | 525/148 |
| 4,048,133 | 9/1977 | Adelmann et al. | 260/37 PC |
| 4,056,504 | 11/1977 | Grundmeier et al. | 260/37 PC |
| 4,080,349 | 3/1978 | Wurmb et al. | 260/37 PC |
| 4,097,435 | 6/1978 | Rawlings et al. | 260/28 R |
| 4,143,094 | 3/1979 | Burzin et al. | 525/176 |
| 4,147,707 | 4/1979 | Alewelt et al. | 260/37 SB |
| 4,172,103 | 10/1979 | Serini et al. | 525/76 |
| 4,172,859 | 10/1979 | Epstein | 428/402 |
| 4,205,141 | 5/1980 | Liebig et al. | 525/67 |
| 4,247,662 | 1/1981 | Thomas | 525/147 |

FOREIGN PATENT DOCUMENTS

WO80/00083  1/1980  World Intel. Prop. Org. .

*Primary Examiner*—Lewis T. Jacobs
*Attorney, Agent, or Firm*—Gene Harsh; Lawrence S. Pope; Aron Preis

[57] ABSTRACT

A glass fiber reinforced polycarbonate composition having an improved level of impact strength and decreased notch sensitivity, comprising an aromatic polycarbonate, glass fibers and a polyanhydride resin which is a copolymer of α-olefin and maleic anhydride is provided.

15 Claims, No Drawings

GLASS-FILLED POLYCARBONATE OF IMPROVED IMPACT STRENGTH

FIELD OF THE INVENTION

This invention relates to polycarbonates and more particularly to glass-filled aromatic polycarbonates containing polyanhydride resin.

BACKGROUND OF THE INVENTION

Polycarbonates derived from reactions involving organic dihydroxy compounds and carbonic acid derivatives have found extensive commercial application because of their excellent mechanical and physical properties. These thermoplastic polymers are particularly suited for the manufacture of molded products where impact strength, rigidity, toughness, thermal stability, dimensional stability as well as excellent electrical properties are required.

In comparison with non-reinforced polycarbonates, glass fiber reinforced polycarbonates have both substantially increased flexural strength and stiffness and a substantially increased E-modulus, but have a decreased impact strength, notched impact strength and elongation at break. This decline in impact and other physical properties is thought to be attributable to the formation of stress concentrations in the vicinity of the individual glass fibers causing propagation of cracks in the molded articles. Improved properties of glass reinforced polycarbonate composites have been reported in U.S. Pat. Nos. 4,056,504; 4,147,707; 4,097,435 and 4,048,133 and in PCT/US79/00371. Polyanhydrides are reported as additives to molding compositions in U.S. Pat. No. 3,586,659 and as an ingredient of a cross-linked polyester in U.S. Pat. No. 3,732,337.

In accordance with the present invention, glass-fiber reinforced aromatic polycarbonates are provided featuring both an improved impact strength and a greater elongation at break.

SUMMARY OF THE INVENTION

A glass fiber reinforced aromatic polycarbonate composition having an improved level of impact strength and elongation at break, comprising an aromatic polycarbonate resin, glass fibers and a polyanhydride resin which is a copolymer of α-olefin and maleic acid anhydride is provided.

DETAILED DESCRIPTION OF THE INVENTION

The polycarbonate resins useful in the practice of the invention are homopolycarbonates, copolycarbonates and terpolycarbonates or mixtures thereof. The polycarbonates generally have molecular weights of 10,000–200,000 (average molecular weight), preferably 20,000–80,000. They may be prepared, for example, by the known diphasic interface process from phosgene and bisphenols by polycondensation (see German OS Nos. 2,063,050; 2,063,052; 1,570,703; 2,211,956; 2,211,957 and 2,248,817 and French Pat. No. 1,561,518, monograph, "H. Schnell, Chemistry and Physics of Polycarbonates, Interscience Publishers, New York, 1964", all incorporated herein by reference).

The aromatic polycarbonates may be based on the following bisphenols: hydroquinone, resorcinol, dihydroxy diphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxyphenyl)-sulphones and α,α'-bis-(hydroxyphenyl)-diisopropyl benzenes, as well as the corresponding compounds substituted in the nucleus. These and other suitable aromatic dihydroxy compounds have been described in U.S. Pat. Nos. 3,028,365; 2,999,835; 3,148,172; 3,271,368; 2,991,273; 3,271,367; 3,780,078; 3,014,891 and 2,999,846 and in German OS Nos. 1,570,703; 2,063,050 and 2,063,052 and in French Pat. No. 1,561,518, all incorporated herein by reference.

Preferred aromatic polycarbonates are those in which 5–100 mol % of the structural units correspond to formula (1):

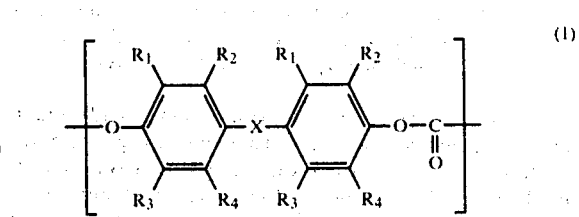

(1)

wherein $R_1$, $R_2$, $R_3$ and $R_4 = C_1-C_{10}$ alkyl, Cl, Br, phenyl and H, but not more than 3 of the groups $R_1$, $R_2$, $R_3$ and $R_4$ may be H; X = a single bond, —O—, —CO—, —$SO_2$—$C_1$–$C_{10}$ alkylene, $C_1$–$C_{10}$ alkylidene, $C_5$–$C_{15}$ cycloalkylene, $C_5$–$C_{15}$ cycloalkylidene, $C_7$–$C_{20}$ cycloalkyl alkylene, $C_6$–$C_{20}$ cycloalkyl alkylidene or

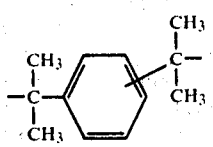

and/or formula (2)

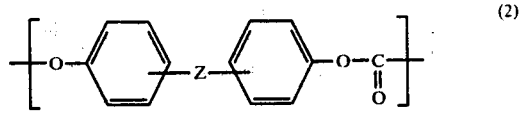

(2)

wherein Z = $C_5$–$C_{20}$ alkylene, $C_5$–$C_{20}$ alkylidene, $C_5$–$C_{15}$ cycloalkylene, $C_5$–$C_{15}$ cycloalkylidene, $C_7$–$C_{20}$ cycloalkyl alkylene or $C_6$–$C_{20}$ cycloalkyl alkylidene.

Aromatic polycarbonates containing 5–30 mol % of structural units of formula (1) and/or (2) as well as those containing 50–100 mol % of these structural units are particularly preferred.

Preferred structural units of formula (1) are those of formula (3):

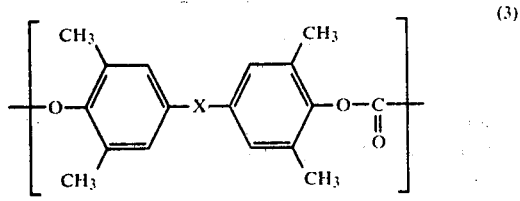

(3)

wherein X is as defined above.

The structural units of formula (3) may be based on the following bisphenols, for example: bis-(3,5-dimethyl-4-hydroxyphenyl); bis-(3,5-dimethyl-4-hydroxyphenyl)-ether; bis-(3,5-dimethyl-4-hydroxyphenyl)-carbonyl; bis-(3,5-dimethyl-4-hydroxyphenyl)-sulphone; bis-(3,5-dimethyl-4-hydroxyphenyl)-methane; 1,1-bis-(3,5-dimethyl-4-hydroxyphenyl)-ethane; 1,1-bis-(3,5-dimethyl-4-hydroxyphenyl)-propane; 2,2-bis-(3,5-dimethyl-4-hydroxyphenyl)-butane; 2,4-bis-(3,5-dimethyl-4-hydroxyphenyl)-2-methyl butane; 2,4-bis-(3,5-dimethyl-4-hydroxyphenyl)-butane; 3,3-bis-(3,5-dimethyl-4-hydroxyphenyl)-pentane; 3,3-bis-(3,5-dimethyl-4-hydroxyphenyl)-hexane; 4,4-bis-(3,5-dimethyl-4-hydroxyphenyl)-heptane; 2,2-bis-(3,5-dimethyl-4-hydroxyphenyl)-octane; 2,2-bis-(3,5-dimethyl-4-hydroxyphenyl)-nonane; 2,2-bis-(3,5-dimethyl-4-hydroxyphenyl)-decane; 1,1-bis-(3,5-dimethyl-4-hydroxyphenyl)-cyclohexane; 1,4-bis-(3,5-dimethyl-4-hydroxyphenyl)-cyclohexane; α,α'-bis-(3,5-dimethyl-4-hydroxyphenyl)-p-diisopropyl benzene; and α,α'-bis-(3,5-dimethyl-4-hydroxyphenyl)-m-diisopropyl benzene.

Those structural units of formulae (1) and (2) which are based on the following bisphenols are particularly preferred: bis-(3,5-dimethyl-4-hydroxyphenyl)-methane; 2,2-bis-(3,5-dimethyl-4-hydroxyphenyl)-propane; 2,4-bis-(3,5-dimethyl-4-hydroxyphenyl)-2-methyl butane; 1,1-bis-(3,5-dimethyl-4-hydroxyphenyl)-cyclohexane; α,α'-bis-(3,5-dimethyl-4-hydroxyphenyl)-p-diisopropyl benzene; 2,2-bis-(3,5-dichloro-4-hydroxyphenyl)-propane; 2,2-bis-(3,5-dibromo-4-hydroxyphenyl)-propane; 1,1-bis-(4-hydroxyphenyl)-cyclohexane; α,α'-bis-(4-hydroxyphenyl)-m-diisopropyl benzene; α,α'-bis-(4-hydroxyphenyl)-p-diisopropyl benzene; 2,4-bis-(4-hydroxyphenyl)-2-methyl butane; 2,2-bis-(3-methyl-4-hydroxyphenyl)-propane; and 2,2-bis-(3-chloro-4-hydroxyphenyl)-propane.

In addition to containing structural units of formulae (1) and (2), the preferred polycarbonates preferably contain structural units of formula (4):

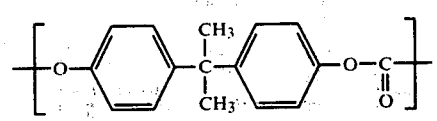

(4)

Polycarbonates based solely on the above-mentioned o,o,o',o'-tetramethyl-substituted bisphenols are particularly important; in particular, the homopolycarbonate based on 2,2-bis-(3,5-dimethyl-4-hydroxyphenyl)-propane.

Also suitable for the preparation of the polycarbonates of the invention are dihydroxybenzenes of the structural formula:

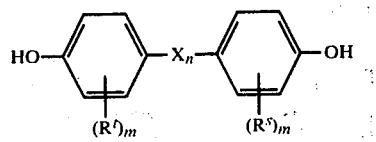

wherein $R^t$ and $R^s$ independently denote $C_1$-$C_{10}$ alkyls, m is an integer of from 0 to 2, X is S,

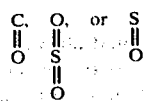

and n is either 0 or 1.

Among the resins suitable in the practice of the invention are included phenolphthalic-based polycarbonate, copolycarbonates and terpolycarbonates such as are described in U.S. Pat. Nos. 3,036,036 and 4,210,741, both incorporated by reference herein.

In order to obtain special properties, mixtures of various di-(monohydroxyaryl)-alkanes can also be used; thus mixed polycarbonate resins are obtained. By far the most useful polycarbonate resins are those based on 4,4'-dihydroxydiaryl methanes and more particularly bisphenol A [2,2-(4,4'-dihydroxydiphenyl)-propane]. Thus, when flame retardant characteristics are to be imparted to the basic polycarbonate resin, a mixture of bisphenol A and tetrabromobisphenol A [2,2-(3,5,3',5'-tetrabromo-4,4'-dihydroxydiphenyl)-propane] is utilized when reacting with phosgene or a like carbonic acid derivative. Other halogenated phenolic diols are any halogen containing bisphenols such as 2,2'-(3,3,3',5'-tetrachloro-4,4'-dihydroxydiphenol)-propane; 2,2-(3,5,3',5'-tetrabromo-4,4'-dihydroxydiphenol)-propane; 2,2-(3,5-dichloro-4,4'-dihydroxydiphenol)-propane; 2,2-(3,3'-dichloro-5,5'-dimethyl-4,4'-dihydroxyphenol)-propane; 2,2-(3,3'-dibromo-4,4'-dihydroxydiphenol)-propane and the like. These halogenated diols are incorporated into the polycarbonates at levels sufficient to impart flame retardant characteristics. For example, a halogen content of about 3 to 10% by weight is normally sufficient.

The polycarbonates of the invention may also be branched by incorporating small quantities of polyhydroxyl compounds in them by condensation, e.g., 0.05-2.0 mol % (based on the quantity of bisphenols used). Polycarbonates of this type have been described, for example, in German OS No. 1,570,533; 2,116,974 and 2,113,347, British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane-2; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)-cyclohexyl]-propane; 2,4-bis-(4-hydroxyphenyl-4-isopropyl)-phenol; 2,6-bis-(2'-dihydroxy-5'-methylbenzyl)-4-methylphenol; 2,4-dihydroxybenzoic acid; 2-(4-hydroxyphenyl)-2-(2,4-dihydroxyphenyl)-propane and 1,4-bis-(4',4''-dihydroxytriphenylmethyl)-benzene.

In addition to the polycondensation process mentioned above and which essentials are described below, other processes for the preparation of the polycarbonates of the invention are polycondensation in a homogeneous phase and transesterification. The suitable processes are disclosed in the incorporated herein by reference U.S. Pat. Nos. 3,028,365; 2,999,846; 3,248,414; 3,153,008; 3,215,668; 3,187,065; 2,064,974; 2,070,137; 2,991,273; and 2,000,835.

The preferred process is the interfacial polycondensation process.

According to the interfacial polycondensation process, copolycarbonate resins are obtained by reacting the aromatic dihydroxy compounds with an alkali metal hydroxide or alkaline earth metal oxide or hydroxide to form the salt of the hydroxy compounds. The salt mixture is present in an aqueous solution or suspension and is reacted with phosgene, carbonyl bromide or bis-chloroformic esters of the aromatic dihydroxy compounds. An organic solvent is provided in the reaction admixture which is a solvent for the polymer but not for the aromatic dihydroxy salts. Thus, chlorinated aliphatic hydrocarbons or chlorinated aromatic hydrocarbons are used as the organic solvent which dissolves the condensation product. In order to limit the molecular weight one may use monofunctional reactants such as monophenols, for example the propyl-, isopropyl- and butyl-phenols, especially p-tert-butyl-phenol and phenol itself. In order to accelerate the reaction, catalysts such as tertiary amines, quaternary ammonium, phosphonium or arsonium salts and the like may be used. The reaction temperature should be about −20° to +150° C., preferably 0° to about 100° C.

According to the polycondensation process in a homogeneous phase, the dissolved reaction components are polycondensed in an inert solvent in the presence of an equivalent amount of a tertiary amine base required for absorption of the generated HCl, such as, e.g., N,N-dimethyl-aniline; N,N-dimethyl-cyclohexylamine or, preferably, pyridine and the like. In still another process, a diaryl carbonate can be transesterified with the aromatic dihydroxy compounds to form the polycarbonate resin.

It is to be understood that it is possible to combine in the processes described above in a chemically meaningful way both the aromatic dihydroxy compounds and the monohydroxy compounds in the form of the alkali metal salts and/or bix-haloformic acid esters and the amount of phosgene or carbonyl bromide then still required in order to obtain high molecular products. Other methods of synthesis in forming the polycarbonates of the invention such as disclosed in U.S. Pat. No. 3,912,688, incorporated herein by reference, may be used.

Glass fibers which may be used to prepare the polycarbonate compositions, are for example, fibers of low-alkali, aluminumborosilicate glass having a maximum alkali metal oxide content of 2.0% by weight (E-glass), of diameter between 8–15μ length between 300 and 800μ (short glass fibers) or 2,000 to 12,000μ (chopped strands) as well as rovings. The glass fibers are present in the polycarbonate in from about 5 to 40% by weight, preferably, about 10 to 30% by weight, based on the weight of the total composition.

Further description of glass fibers suitable in the practice of the invention is to be found in "Harro Hagen, Glasfaserverstäzkte Kunststoffe" (Glass-Fiber Reinforced Plastics), Springer-Verlag, Berlin, Guttingen, Heidelberg, 1961 and in U.S. Pat. No. 3,577,378, both incorporated herein by reference.

The polyanhydride resins suitable in the practice of the present invention are characterized by their structural formula:

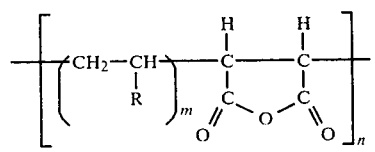

(II)

where R is a phenyl or an alkyl substituted phenyl radical or an alkyl radical preferably having more than 4 carbon atoms, and most preferably from about 12 to about 16 carbon atoms. In general, the carbon atoms of R may not be greater in number than 28, while n is an integer of from 1 to 200, and m is an integer of from 1 to 3. In the most preferred embodiment n is about 145 and m is 1. Essentially the polyanhydride resin is a copolymer of maleic anhydride and an α-olefin the preparation of which copolymer is described in U.S. Pat. No. 3,586,659 hereby incorporated by reference. Examples of olefin compounds or mixtures of olefins suitable for forming the polyanhydride component of the composition include: ethylene, 1-propane, 1-decene; 1-butene; 1-undecene; 1-isobutylene; 1-hexene; 1-dodecene; 1-pentene; 1-tridecene; 1-heptene; 1-octene; 1-tetradecene; 1-octadecene; 1-nonadecene; styrene; 1-nonene and mixtures thereof.

The copolymerization procedure may involve contacting the olefinic compound with the maleic anhydride in a suitable solvent in the presence of a catalyst. The molar ratio of the mono-α-olefin to maleic anhydride is desirably between about 1:1 and 3:1.

The preferred polyanhydride suitable in the practice of the invention is a copolymer of 1-octadecene and maleic anhydride of a 1:1 molar ratio is available from Gulf Oil Chemical Company under the trade name, PA-18. Typically, PA-18 is further characterized by its properties shown in the table below:

| | |
|---|---|
| Color/form | White powder |
| Molecular Weight | 50,000 |
| Specific Gravity | 0.97 |
| Melting point range | 110–120 |
| Inherent viscosity[1] | 0.10–0.13 |
| Viscosity @ 150° C.: (cps) | 20,000 |
| @ 160° C.: (cps) | 8,000 |
| Anhydride equivalent, meq/g | 3.10–3.25 |
| Neutralization equivalent, meq/g | 4.83–5.53 |
| Anhydride content, wt. % | 15–23 |
| Acid content, wt. % | 5–10 |
| Volatiles, % | <1 |
| Residual monomer | <3 |
| Thermal Stability @ 250° C. (wt. loss %) | 1 |
| @ 300° C. (wt. loss %) | 3 |
| @ 350° C. (wt. loss %) | 10 |
| @ 400° C. (wt. loss %) | 23 |

[1] 5 gm/100 ml in methylisobutyl ketone @ 77° F.

In practice of the invention glass-reinforced polycarbonate compositions containing 5 to 40% by weight, preferably 10 to 30% by weight, glass fibers may be modified by incorporation therein 0.1 to 10, preferably 0.5 to 5 and most preferably 0.8 to 3.75% by weight of the polyanhydride resin. Of particular interest is the embodiment where a sufficient amount of flame retarding agents are added to the composition to render its V-O rating at 1/16" in accordance with UL-94.

To prepare molding compositions according to the present invention, the individual components are mixed in known mixing devices, such as kneaders, single-screw extruders, twin-screw extruders, mills and the like.

The invention will be further illustrated, but is not intended to be limited, by the following examples.

EXAMPLES

EXAMPLE 1

Impact modified glass-fiber reinforced polycarbonate compositions were compounded using a single-screw extruder (2.75:1 screw; 60 rpm) at about 485° F. The compositions were all based on Merlon M-39 polycarbonate resin (Mobay Chemical Corporation) and included 10% by weight glass fibers (Owens Corning 415BB, 3/16"). The effects of the incorporation of various polyanhydride resins, differing from each other in their respective α-olefin chains, on the impact performance and the tensile properties of the compositions were measured. All the compositions of this example were compounded to incorporate 1.25% by weight of polyanhydride.

| α-Olefin Chain Length of the Polyanhydride Resin(a) | Impact Strength | | | Tensile Strength | |
|---|---|---|---|---|---|
| | ⅛″-Izod (J/m) | | Dart(b) Drop (J) | Yield MPa | Elongation % |
| | notched | un-notched | | | |
| unmodified(c) | 94 | >2100 | 95 | 71 | 2 |
| 6 | 121 | 1320 | 86 | 66 | 5 |
| 10 | 165 | 1450 | 88 | 65 | 9 |
| 14 | 216 | 1910 | 94 | 61 | 18 |
| 18 | 217 | 2250 | 92 | 59 | 15 |

(a)Polyanhydride resins by Gulf Oil Chemical Corporation
(b)1″ tup
(c)Polycarbonate/10 wt. % glass fibers

EXAMPLE 2

Impact modified glass fiber reinforced polycarbonate compositions were compounded in accordance with the procedure described in Example 1. The compositions based on Merlon M-39 polycarbonate (Mobay Chemical Corporation) and all containing 10% by weight glass fibers, varied from each other in the amount of PA-18 (polyanhydride of α-octadecene) incorporated therein. The effects of the variations of the amount of PA-18 on the impact strength and tensile properties of the compositions were measured and are tabulated below.

| | Impact Strength | | | | Tensile Properties | |
|---|---|---|---|---|---|---|
| | ⅛″ Izod (J/m) | | Dart (J) Drop | Yield Strength MPa | Failure Strength MPa | Elongation (%) |
| PA-18 (wt %) | notched | un-notched | | | | |
| 0 | 94 | >2100 | 95.4 | — | 71 | 2 |
| 1.25 | 253 | 2200 | 87.1 | 59.5 | 47.6 | 17 |
| 2.5 | 247 | 1881 | 90.9 | 60.4 | 47.0 | 20 |
| 3.75 | 254 | 1781 | 55.9 | 59.2 | 46.9 | 20 |
| 5.0 | 219 | 1800 | 31.2 | — | 60 | 2 |
| 10.0 | 141 | 630 | <1 | — | 52 | 2 |

EXAMPLE 3

Impact modified, glass fiber reinforced flame resistant polycarbonate compositions were compounded according to the procedure described in Example 1 above. The compositions based on glass fiber reinforced flame resistant polycarbonate (Merlon 9510 Mobay Chemical Corporation) varied from each other in the amounts of PA-18 incorporated therein. The table below demonstrates the relations between the amount of PA-18 and the properties of the compositions.

| Amount of PA-18, (%) | Impact Strength Izod ⅛″ (J/M) | | Dart Drop (J) | HDT at 264 psi (°C.) | Flammability UL-94, 1/16″ | |
|---|---|---|---|---|---|---|
| | notched | un-notched | | | Class | Burn Time (Sec) |
| 0 | 94 | >2350 | 105 | 133 | V-O | 2.1 |
| 0.8 | 116 | >2500 | 85 | 125 | V-O | 2.3 |
| 1.5 | 207 | 2100 | — | 125 | V-O | 3.0 |
| 2.5 | 242 | 1900 | — | 123 | V-O | 2.6 |

EXAMPLE 4

The effect of increasing the level of added modifier on the impact performance of glass reinforced polycarbonate compositions of 20 wt. percent glass fibers content, was measured on specimens prepared as described above. Test results are shown in the table below.

| PA-18 Concn. % | IZOD IMPACT - ⅛″ | | Dart Impact 1″ TUP J | HDT 264 psi °C. |
|---|---|---|---|---|
| | Notch J/m | Unnotched J/m | | |
| 0 | 158 | 800 | 41.5 | 142 |
| 0.8 | 177 | 945 | 48 | 140 |
| 1.5 | 184 | 870 | 40.5 | 136 |

EXAMPLE 5

Similar to the compositions above, polycarbonates containing 30 percent by weight of glass fibers were prepared and their properties are reported below.

| Concn. % | IZOD IMPACT - ⅛″ | | Dart Impact 1″ TUP J | HDT 264 psi °C. |
|---|---|---|---|---|
| | Notch J/m | Unnotch J/m | | |
| 0 | 125 | 830 | 2 | 142 |
| 0.8 | 107 | 205 | 12 | 142 |
| 1.5 | 141 | 290 | 18 | 140 |

The molding conditions employed upon the preparation of the glass-reinforced polycarbonates are shown in the following table:

| PA-18 % | TEMPERATURE | | | INJECTION | | | Screw Speed RPM | Mold Temp. °F. | Inj. Rate Setting |
|---|---|---|---|---|---|---|---|---|---|
| | Barrel 1 °F. | 2 °F. | Nozzle °F. | Cycle Sec. | Time Sec. | Press. psi | | | |
| 0 | 570 | 570 | 510 | 35 | 22 | 900 | 100 | 200 | fast |
| 1-3 | 525 | 525 | 505 | 22-35 | 12-22 | 900 | 100 | 225 | fast |
| 4-5 | 500 | 500 | 465 | 35 | 22 | 750 | 90 | 210 | fast |
| 10 | 440 | 440 | 420 | 35 | 22 | 500 | 100 | 200 | fast |

As can be readily observed upon analyzing the data, the notch sensitivity of glass fiber reinforced polycarbonates decreased upon the incorporation therein of the polyanhydride resin. It is further noted that the desensitization to notch effects is directly proportional to the α-olefin chain length of the added polyanhydride.

Although the invention has been described in detail in the foregoing for the purpose of illustration, it is to be understood that such detail is solely for that purpose and that variations can be made therein by those skilled

What is claimed is:

1. A polycarbonate molding composition comprising
   (a) an aromatic polycarbonate resin,
   (b) about 5 to 40% by weight, based on the total composition of glass fibers and
   (c) about 0.1 to 10% by weight, based on the total composition of a polyanhydride resin characterized by the structural formula:

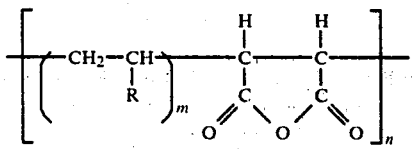

wherein R is a phenyl or an alkyl substituted phenyl radical or an alkyl radical having from 4 to 16 carbon atoms, n is an integer of from 1 to 200 and m is from 1 to 3.

2. A polycarbonate molding composition comprising
   (a) an aromatic polycarbonate resin,
   (b) about 5 to 40% by weight, based on the total composition of glass fibers and
   (c) about 0.8 to 3.75% by weight, based on the total composition of a polyanhydride resin characterized by the structural formula:

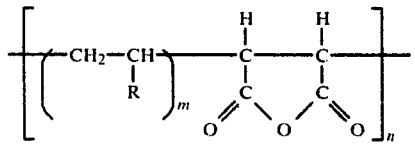

wherein R is a phenyl or an alkyl substituted phenyl radical or an alkyl radical having from 4 to 16 carbon atoms, n is an integer of from 1 to 200 and m is from 1 to 3.

3. The molding composition of claim 1 wherein said polyanhydride resin is present in an amount of between 0.5 and 5% by weight, relative to the weight of said composition.

4. The molding composition of claim 1 or 2 wherein said glass fibers are present in an amount of between 10 and 30% by weight relative to weight of said composition.

5. The molding composition of claim 1 or 2 wherein said polyanhydride is a copolymer of α-octadecene and maleic acid anhydride having a molar ratio of 1:1.

6. The molding composition of claim 1 or 2 wherein said polycarbonate is based on bisphenol-A.

7. The molding composition of claim 1 or 2 further comprising flame retarding agents.

8. A process for desensitizing the notch effects of glass fiber reinforced aromatic polycarbonate compositions containing 5 to 40 percent by weight glass fibers comprising blending therein about 0.1 to 10% by weight, relative to the weight of the composition of a polyanhydride characterized by the structural formula:

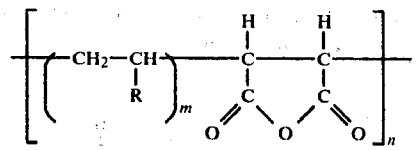

wherein R is a phenyl radical or an alkyl radical having from 4 to 16 carbon atoms, n is an integer of from 1 to 200, and m is an integer from 1 to 3.

9. A polycarbonate molding composition comprising
   (a) an aromatic polycarbonate resin,
   (b) about 5 to 40% by weight, based on the total composition of glass fibers,
   (c) about 0.1 to 10% by weight, based on the total composition of a polyanhydride resin characterized by the structural formula:

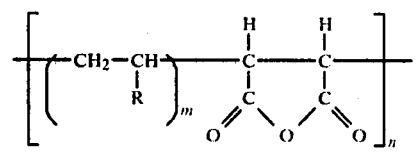

wherein R is a phenyl or an alkyl substituted phenyl radical or an alkyl radical having from 4 to 16 carbon atoms, n is an integer of from 1 to 200 and m is from 1 to 3,
   (d) a sufficient amount of flame-retarding agents to render this composition V-O rating at 1/16" according to UL-94.

10. A polycarbonate molding composition comprising
    (a) an aromatic polycarbonate resin,
    (b) about 5 to 40% by weight, based on the total composition of glass fibers and
    (c) about 0.1 to 10% by weight, based on the total composition of a polyanhydride resin characterized by the structural formula:

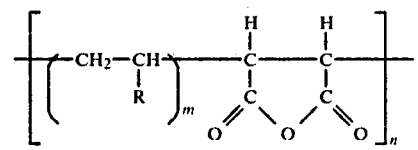

wherein R is an alkyl radical having from 4 to 16 carbon atoms, n is an integer of from 1 to 200 and m is from 1 to 3.

11. The composition of claim 10 wherein said glass fibers are present in an amount of between 10 to 30% by weight relative to weight of said composition.

12. The composition of claim 10 wherein said polyanhydride resin is present in an amount of between 0.5 and 5% by weight, relative to the weight of said composition.

13. The composition of claim 10 or 11 or 12 wherein said polyanhydride is a copolymer of α-octadecene and maleic acid anhydride having a molar ratio of 1:1.

14. A polycarbonate molding composition comprising
    (a) an aromatic polycarbonate resin,
    (b) about 5 to 40% by weight, based on the total composition of glass fibers, (c) about 0.1 to 10% by weight, based on the total composition of a polyanhydride resin characterized by the structural formula:

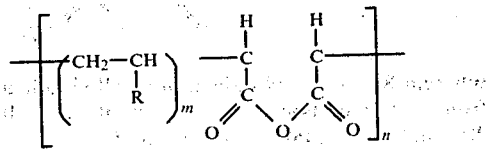

wherein R is an alkyl radical having from 4 to 16 carbon atoms, n is an integer of from 1 to 200 and m is from 1 to 3, (d) a sufficient amount of flame-retarding agent to render this composition V-O rating at 1/16" according to UL-94.

15. A process for desensitizing the notch effects of glass fibers reinforced aromatic polycarbonate compositions containing 5 to 40 percent by weight glass fibers comprising blending therein about 0.8 to 3.75% by weight, relative to the weight of the composition of a polyanhydride characterized by the structural formula:

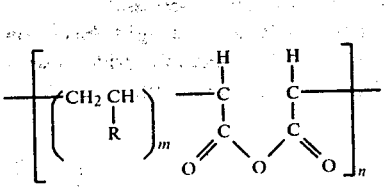

wherein R is a phenyl radical or an alkyl radical having from 4 to 16 carbon atoms, n is an integer of from 1 to 200, and m is an integer from 1 to 3.

* * * * *